United States Patent Office 3,397,581
Patented Aug. 20, 1968

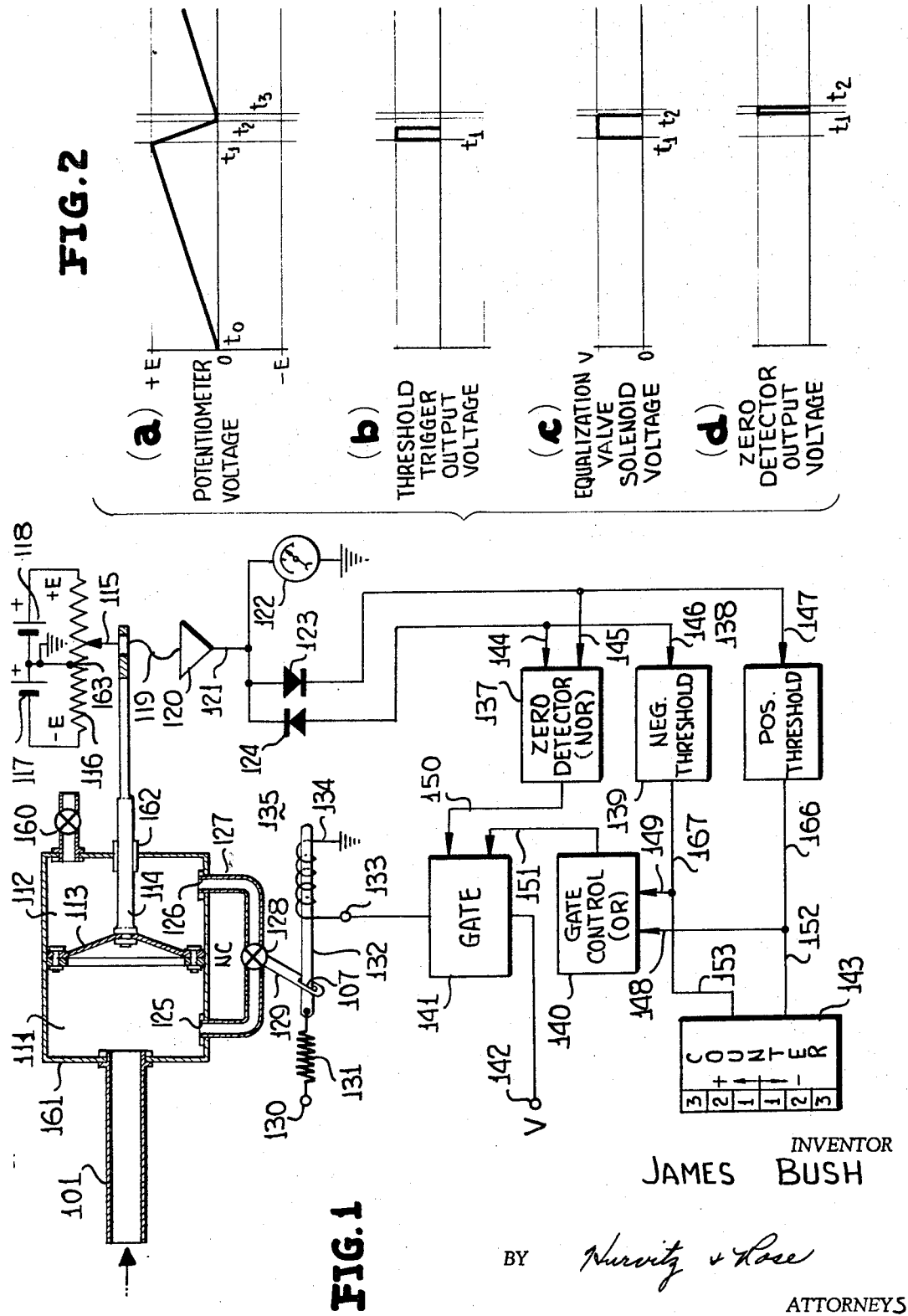

3,397,581
RANGE SWITCHING FOR PRESSURE GAUGE
James Bush, Palm Beach, Fla., assignor to Marine International, Inc., Arlington, Va., a corporation of Delaware
Filed Feb. 11, 1966, Ser. No. 526,801
10 Claims. (Cl. 73—407)

ABSTRACT OF THE DISCLOSURE

There is provided a pressure meter having means for extending the range of the meter over that which would be normally expected. The meter includes two chambers with a pressure to be measured applied to one chamber. Differential in pressure between the chambers is measured. When the differential approaches or equals the maximum pressure of the indicating device the pressure in the two chambers is equalized, and thereafter pressure readings are again taken with the deflection at the time of equalization being added to the now-current reading. Equalization may be done manually or automatically. Where done automatically, an up-down counter is employed to determine the change in the scale factor necessary to achieve proper pressure reading.

---

The present invention relates to differential pressure meters and, in particular, to a method and apparatus for extending the range of pressure measurement obtained with a particular pressure meter to a range greater than that for which it was originally designed.

Differential pressure meters are normally constructed utilizing a unitary housing having two adjacent chambers separated by a movable wall or diaphragm. An inlet port is disposed in one of the chambers to provide communication of the same with the fluid supply to be measured while the other chamber is maintained at some known pressure. A mechanical linkage and readout means is attached to the diaphragm to indicate differences in fluid pressure between the two chambers, since unequal chamber pressures will necessarily result in the diaphragm moving, or extending, in a direction from the chamber of higher pressure toward the chamber of lower pressure.

An alternative construction of a differential pressure meter involves the utilization of two separate and isolated chambers, one of which is maintained at a given and known pressure (one atmosphere, for example) and the other of which is at the pressure of the supply to be measured. An external differential fluid measuring device is then provided, such as a manometer or the like, having one end in communication with one chamber and the other end in communication with the other chamber. The difference in pressure may thus be read directly from the difference in liquid levels in the two arms of the manometer.

In each type of differential pressure meter construction, means may generally be provided for translating the differential indication of the diaphragm, manometer, or any suitable type of reactor to another, more convenient form; as for example, to an electrical quantity, measurable with a suitable electrical meter or instrument. This is especially so in the former type of construction wherein the mechanical linkage attached to the movable diaphragm may be adapted to control the movement of a potentiometer wiper-arm which, in turn, may register its movement on an electrical meter mechanism responsive to a voltage across a portion of the potentiometer resistor as will be described in more detail hereinafter.

However, with the above-described construction, since the diaphragm must necessarily have a limited extension or movement, the full scale measurement or range of measurements of pressure differential must also be limited.

Accordingly, it is an object of the present invention to obviate this limitation on the range of fluid pressure measurement by providing a means for controllably and momentarily equalizing the fluid pressure in each of the chambers whenever the indicating device reaches full scale deflection. This results in a zero differential reading which is, in fact, one full scale measure. Thus, with a further change in pressure at the fluid inlet port, the indicating device reading must be corrected by a proper scale factor and in this manner, the effective range of the differential pressure meter may be extended.

More particularly, where the movement of the diaphragm separating the two chambers operates a potentiometer such that the pressure differential therebetween is indicated on a voltmeter connected thereto, a passage and valve arrangement may be provided to selectively communicate between the two chambers. Thus, for example, when the pressure at the inlet port increases to the full scale deflection of the indicating device, i.e., the voltmeter in this case, and the pressure at the inlet port is constant or changing slowly, the valve is opened to permit that fluid pressure of the inlet chamber and hence, fluid pressure producing system, to flow into and equalize the pressure in the other chamber which previously was at the zero full scale starting pressure. The voltmeter now registers zero differential. The valve is then closed. This isolates the two chambers again and it is now known that the reference chamber is at a pressure equal to the full scale value. Continued increase in the pressure at the input chamber will be registered by the voltmeter as it is deflected once again from zero to a second full scale deflection. Obviously, to know the true pressure, it is necessary to keep count of the number of full scale deflections.

Of course, it is understood that the indicating device need not be a voltmeter, but may be any type of indicator such as a mechanical gauge, a manometer, or any device which would translate a differential pressure to a readout. Furthermore, the control of the pressure equalizing valve in the passage between the two chambers may be automatic in response to a full scale reading of the pressure differential indicator or this control may be entirely manual. That is, the operator on seeing that the indicator has reached full scale may open the pressure equalization valve which returns the reading indicator to zero. Then he closes the valve and records the fact that this operation has occurred in order to note that the full scale reading of the indicator must now be multiplied by the number of times the pressure in the chambers has been equalized and this product is added to any subsequent reading to provide the proper value of pressure at the inlet port.

It is also possible to construct the differential pressure meter such that the aforementioned passage, instead of controllably communicating directly between the two chambers, provides controllable communication between the reference pressure chamber and the pressure producing system itself. However, it is usually preferred to maintain such passage of the least permissible length in order to provide the shortest obtainable pressure equalization time between the two chambers.

Thus, the pressure meter first utilizes the ambient pressure or, most often, one atmosphere of pressure in its closed chamber (of course any other known or starting reference pressure might be used); then, at full scale deflection, the input chamber is opened to the closed chamber pressure which, if the one atmosphere of pressure is lower than the pressure of the input chamber at full scale deflection, causes the pressure of the closed chamber to increase to the full scale value, equalizing both chamber pressures and setting the differential indicator to zero. By continuously performing these steps, the range of any given differential pressure meter could theoretically be extended indefinitely.

This technique will be operable so long as the deviations in the fluid pressure to be measured are relatively small in the period of time that the device takes for equalization. Since equalization takes place fairly rapidly, this should present no serious difficulties in normal applications. Also, in extreme cases of large, and rapid pressure deviations, pressure controlling arrangements might be provided at the inlet port to maintain the above-described conditions; such arrangements being apparent to those skilled in the art.

It is a further object of the present invention to provide an economical means for extending the range of a differential pressure meter whereby such means may be operated either manually or automatically.

It is still another object of the present invention to extend the range of measurement of a differential pressure meter while improving the precision of the indicator scale; such precision being attained by the utilization of only a single meter scale in conjunction with an appropriate scaling factor such that each change in reference pressure may be noted.

The above and still further objects, features and advantages of the present invention will become apparent upon consideration of the following detailed description of one specific embodiment thereof, especially when taken in conjunction with the accompanying drawing, wherein:

FIGURE 1 is a schematic illustration of one embodiment of the present invention with means for providing automatic control thereof; and FIGURE 2 is an illustration of waveforms present in the operation of the embodiment of the present invention shown in FIGURE 1.

Referring now to FIGURE 1, a differential pressure meter is shown having a metal housing 161 which is divided into two chambers 111 and 112 by a movable reactor diaphragm 113. A fluid inlet tube 101 is provided to connect a source of fluid pressure to chamber 111 as indicated by the arrow.

A pressure equalization passage, or pipe, 127 connects chambers 111 and 112 at 125 and 126, respectively. The pipe 127 might alternatively be connected between the pressure producing system, represented by the inlet pipe 101, and the chamber 112. Disposed in pipe 127 is a normally closed valve 128 which is maintained in that position by the spring 131. The spring 131 is fastened at one end to the fixed point 130 and at the other end to the solenoid 135. Specifically, the other end of the spring is fixed to the solenoid armature 132 which is linked to the equalization valve arm 129 through a pin and slot linkage 107. The coil of solenoid 135 has one end electrically connected to terminal 133 and the other end electrically connected to ground at 134.

A port and valve assembly 160 is provided in one wall of chamber 112 to permit the temporary venting of this chamber to atmosphere or to establish any pressure therein that is desired by connection thereof to any appropriate environment. The chamber 112, as will be described in greater detail hereinafter, establishes the reference pressure on which basis the differential pressure of the fluid at the inlet port and chamber 111 is measured.

A rigid shaft 114 is fastened to the center portion of the movable diaphragm 113 and passes through fluid-tight seals 162 to the exterior of the housing 161. The exterior end portion of shaft 114 is fixed to the wiper arm of a conventional potentiometer comprising a center tapped resistance element 116. The negative end (−E) of element 116 is connected to the negative terminal of battery 117. The positive terminal of battery 117 is connected to the negative terminal of battery 118. The positive terminal of battery 118 is connected to the positive end (+E) of the resistance element 116 and each battery, 117 and 118, has the same rating. The centertap 163 is connected to the junction between batteries 117 and 118 and is maintained at a reference potential such as ground, as shown in FIGURE 1.

The wiper contact 115 taps off a voltage which is proportional to its displacement from the centertap 163. Thus, for a given displacement to the right of the centertap 163, the voltage on the contact 115 will be to the voltage +E as the given displacement is to the physical length of this half of the resistance element. With the batteries 117 and 118 of equal voltage and the resistance element 116 having a linear and symmetrical characteristic, the potentiometer will provide an accurate and precise means for translating the physical axial displacement of shaft 114 into corresponding changes in voltage. Of course, non-linear systems may also be employed if a non-linear diaphragm is employed or a non-linear response is desired.

Electrically connected to the wiper contact 115, which is fixed to the shaft 114, is a high input impedance D.C. amplifier which serves to isolate the following measuring and control circuitry from the potentiometer 165. Lead 121 connects the output of amplifier 120 to the volmeter 122 which may be calibrated in units of pressure (p.s.i.). Thus, the meter 122 is utilized to read the relative pressure in chamber 111 directly. The meter 122 may be calibrated in any unit of measurement known to the art.

The lead 121 also connects the output of amplifier 120 to the anode of diode 123 and the cathode of diode 124. The other respective electrodes, i.e., the cathode of 123 and the anode of 124, are connected to the positive threshold and negative threshold pulse generator circuits 138 and 139, respectively. These circuits may be conventional Schmitt trigger circuits having a fixed threshold trigger voltage, the construction of which is well known in the art. When the absolute value of the input voltage attains the threshold trigger voltage, the circuit generates a pulse of predetermined duration.

The output leads 166 and 167 of threshold circuits 138 and 139 provide two inputs 148 and 149, respectively to the gate control circuit 140 which may be an OR gate of any conventional type. The output leads 166 and 167 also provide input connections to the counter 143. The counter 143 may be a six stage register having the capability of stepping in a forward or backward direction in response to positive or negative pulses or may comprise separate registers responding to pulses on each of leads 152 and 153. Such counters are known to the art and the construction thereof forms no part of the present invention. Any conventional counting device may be utilized and the registers above described are merely for purpose of example.

The output of the gate control circuit 140 is connected to the "turn-on" terminal of the power gate 141 through lead 151. Activation of gate 141 permits the voltage V on terminal 142 to be applied to terminal 133 and thus, to the equalization valve solenoid 135. The gate 141 may comprise a conventional latching relay activated by a voltage on lead 151 and released at the "turn-off" terminal (e.g., by an unlatching coil) and connected to the lead 150. The voltage V may be either A.C. or D.C. depending on the characteristics of the particular solenoid used.

The zero detector 137 is fed by input leads 144 and 145 which are connected respectively to the anode of diode 124 and the cathode of diode 123 and produces an output pulse when and only when both leads 144 and 145 are at zero potential. The output voltage on lead 150 turns off gate 141, as previously mentioned, which switches off the voltage V to terminal 168.

Should there be any potential on leads 144 and 145, not equal to zero, the output on lead 150 will be zero. As such, the circuit 137 may comprise a NOR logic gate which is well known in the art. Alternatively, the zero detector 137 may be constructed, connected and arranged in any known manner to detect the zero voltage position of the wiper contact 115 in the potential circuit 165. Such zero detection might also be achieved by means of an auxiliary contact at the zero potential position of wiper 115 which closure would produce the "turn-off" voltage for gate 141.

In the operation of the present invention, the fluid pressure in chamber 112 is at a predetermined value of, for example, one atmosphere. The fluid to be measured flows into chamber 111 through the inlet tube 101. Assuming that the fluid pressure at the inlet port 101 is increasing and is greater than one atmosphere, the diaphragm 113 is forced toward the chamber 112. The shaft 114 is moved to the right, moving the wiper 115 from the centertap zero differential position toward the positive battery potential $+E$. The increasing voltage at the wiper 115 is shown in FIGURE 2a for a steadily increasing pressure from one atmosphere (time=$t_0$) to a certain value at full deflection (time=$t_1$).

Normally, differential pressure meters of known construction would thus be limited to this range of measurement; however, in accordance with the present invention, means are provided which extend the range of such a meter to a theoretically unlimited degree.

Thus, a voltage which is directly proportional to the voltage on wiper 115 is applied to voltmeter 122 through the amplifier 120. The meter is calibrated such that when the wiper 115 is set at the maximum positive voltage $+E$, the needle deflection, or reading, is at full scale range.

A replica of the voltage pulse shown in FIGURE 2a is also applied to the diodes 123 and 124. Since the voltage is positive with respect to ground, it is blocked by diode 124 and passes diode 123 which is forward biased by this voltage.

Therefore, the positive going voltage is applied to the positive threshold circuit 138 and the zero detector circuit 137. The threshold circuit 138 is set to trigger at the voltage corresponding to the full scale deflection of meter 122. Thus, at this point (time=$t_1$) the circuit 138 generates a pulse, as shown in FIGURE 2b which steps the counter 143 to one and actuates a first "factor indicator," indicating that the pressure represented by full scale deflection of meter 122 must be added to the present reading. The pulse generated by the circuit 138 also activates the gate control circuit 140 which, in turn, turns on the gate 141. This applies the voltage V to the solenoid 135, as shown in FIGURE 2c, which is activated thereby and opens valve 128.

On activation of solenoid 135, the armature 132 pulls in against the force of spring 131 and opens the normally closed valve 128. The higher fluid pressure present within chamber 111, which is at a pressure equal to the full scale deflection of meter 122, moves through the passage 126 into the chamber 112. Thus, the pressure in chambers 111 and 112 equalize at the full scale pressure. This follows, because the inlet pipe 101 permits the fluid pressure in chamber 111 to be maintained by continuing to feed the line pressure to the meter. This eliminates the effect of averaging the pressure of the fluid in the two chambers as would be the case where the inlet port was closed defining a closed system volume. If the pressure at the input port to chamber 111 should materially increase during the equalization period, the equalized pressure in both chambers would be higher than the previous full scale reading. Therefore, the deviation in pressure from time=$t_1$ to $t_3$ must be relatively small as compared with the unit of measure. It should be noted that, for the purpose of illustration, the voltages and times shown in FIGURE 2 are not proportioned to scale, but are expanded in time.

As the chamber 112 begins to increase its pressure, the diaphragm 113 and connected shaft 114 move toward chamber 111 and the wiper 115 returns to the zero point. Thus, the voltage at wiper 115 decreases to zero as shown in FIGURE 2a between time=$t_1$ and $t_2$.

When the pressure differential equals zero, input leads 144 and 145 of the zero detector 137 are at zero potential which causes a voltage output on lead 150 as shown in FIGURE 2d. This voltage turns off the gate 141 which causes solenoid 135 to release closing valve 128. This slight delay in closing the valve is shown as the interval of time=$t_3-t_2$.

Now the measuring continues with the meter 122 starting from zero and going to a second full scale deflection. The appropriate scale factor is read from the counter 143 which steps each time a threshold is reached; that is, as previously stated, at every full scale deflection of meter 122.

In this manner, the individual scale markings of meter 122 may be spread to a greater degree over the dial face than would be possible if the same range of measurement were to be made without utilizing the present invention. If the diaphragm were constructed to respond to a greater range of pressures, then for a given change, the wiper would necessarily move a smaller amount and the entire range might be scaled off directly on meter 122.

However, this would result in the meter being more difficult to read and would lessen the precision of the meter.

Although the operation of the apparatus has been described with reference to the measurement of an increasing pressure, the method and apparatus, in accordance with the present invention, is equally applicable to the measurement of a decreasing pressure, i.e., a pressure which is decreasing from the standard reference pressure contained within chamber 112. In this case, the diaphragm 113 and shaft 114 move toward chamber 111 causing the wiper to move to the negative portion of the resistance element 116. Thus, a negative voltage is produced which is blocked by diode 123 and passed by diode 124 to the negative threshold circuit 130. This circuit generates a pulse on lead 167 which steps counter 143 through lead 153 to register the appropriate scale factor. The generated pulse is also fed to the gate control circuit 140 which turns on the gate 141 in the same manner as previously described.

Of course, the operation might be performed manually, there the measure of pressure of the fluid in the first or inlet chamber is derived by reading the indicating means and algebraically adding the previous full scale readings thereto. It is understood that the term "algebraically adding" contemplates and includes both addition, in the case of increasing pressure, and subtraction, in the case of decreasing pressure since in the latter case, the addition is of a neagtive scale reading.

The electronic system herein disclosed is an example of only one technique for implementing the present invention. Other techniques, including the use of various arrangements of limit switches in conjunction with the potentiometer 165, or a direct or indirect mechanical linkage between the diaphragm 113 and the valve 128 will become evident to those skilled in the art. Furthermore, the operation of valve 128 might be manual and not automatic at all.

The maximum usable pressure with the differential pressure meter of the invention is determined not by the physical limitation of the pressure sensitive element but rather by the pressure limitations of the system itself.

In the examples given above, the scale factors are added to the present reading of the meter to correct for range switching. Thus, if the meter scale reads over a range "X" and the meter has exceeded its scale range "Y" number of times in order to obtain the correct pressure reading, the meter reading is corrected by adding XY thereto. If, however, the meter is calibrated in percentage of deflection, then a multiplying scale factor is employed. For instance, if the meter has exceeded its range "X" number of times and the present reading is Y percent, the pressure indicated by total scale deflection is multiplied by the factor XY. Thus, the apparatus of the invention can accommodate either of the two most common scales employed on present-day meters.

The output signals of the apparatus are indicated to be voltage levels. Other types of signals may be generated, such as carrier modulation (A.M. or F.M.), a mechanical readout. In the latter case, the arm 114 may operate a plus, minus mechanical counter at the opposite end of its ranges.

While I have described and illustrated one specific embodiment of my invention, it will be clear that variation of the details of construction which are specifically illustrated and described may be resorted to without departing from the true spirit and scope of the invention as defined in the appended claims.

I claim:
1. A differential pressure meter comprising:
   first and second chambers;
   a fluid inlet port to said first chamber to contain the fluid pressure to be metered;
   indicating means responsive to differences in the fluid pressure between said first and second chambers for deriving a measure thereof;
   said indicating means having a full scale calibration corresponding to a given differential pressure;
   equalizing means for bringing the pressure in said second chamber equal to the pressure in said first chamber when said given differential pressure is indicated;
   said indicating means then being responsive to further differences in the fluid pressure between said chambers whereby the range of calibration of said meter is extended.
2. The pressure meter according to claim 1 wherein said equalizing means comprises a fluid passage communicating between said second chamber and the fluid pressure to be metered.
3. The pressure meter according to claim 2 wherein said fluid passage provides communication between said first and second chambers.
4. The pressure meter according to claim 2 wherein said equalizing means further comprises valve means disposed within said passage for normally maintaining each of said first and second chambers sealed from the other and for providing fluid flow therebetween when a full scale differential pressure is indicated.
5. A method of extending the calibration range of a differential pressure meter having a first chamber to contain the fluid pressure to be measured; a second chamber to contain a reference pressure; and indicating means having a full scale calibration corresponding to a given differential pressure therebetween; said method comprising the steps of providing fluid communication between said first and second chambers when said given differential pressure is indicated to bring the pressure in said second chamber equal to the pressure in said first chamber; sealing each of said chambers from the other after a state of equal pressure has been achieved; and deriving the measure of pressure of the fluid in said first chamber by reading said indicating means and algebraically adding said full scale calibration thereto, whereby the range of calibration of said meter is extended.
6. The combination according to claim 1 wherein said equalizing means comprises means for equalizing the pressure in said chamber when said given differential in pressure is indicated.
7. The combination according to claim 6 further comprising means for counting the number of times said equalizing means equalizes the pressures in said chamber.
8. A differential pressure meter comprising:
   first and second chambers;
   means connecting said first chamber to a pressure to be measured which varies over a range of pressures as a continuous function;
   indicating means responsive to differences in the fluid pressure between said first and second chambers for deriving a measure thereof;
   said indicating means having a full scale calibration corresponding to a given differential pressure multiplied by a predetermined calibration factor; and
   means for changing said calibration factor including means when actuated for equalizing the pressures in said chambers.
9. The combination according to claim 10 wherein said indicating means has a full scale calibration which is less than the range of variations in the pressure to be measured.
10. The combination according to claim 8 further comprising means for actuating said equalizing means when said given differential pressure exists between said chambers.

References Cited

UNITED STATES PATENTS 3,054,295   9/1962   Burner _____ 73—391

DAVID SCHONBERG, *Primary Examiner.*

DENIS E. CORR, *Assistant Examiner.*